United States Patent [19]

Budzich

[11] 3,962,872

[45] June 15, 1976

[54] HYDROSTATIC TRANSMISSION MIXED LOOP SYSTEM

[76] Inventor: Tadeusz Budzich, 80 Murwood Drive, Moreland Hills, Ohio 44022

[22] Filed: Mar. 3, 1975

[21] Appl. No.: 554,619

[52] U.S. Cl. .................................. 60/453; 60/456; 60/461; 60/464; 60/465; 60/466
[51] Int. Cl.² ......................................... F15B 15/18
[58] Field of Search ............. 60/378, 453, 454, 456, 60/464, DIG. 5, 460, 465, 486, 461, 466; 91/420

[56] References Cited
UNITED STATES PATENTS

| | | | |
|---|---|---|---|
| 2,059,155 | 10/1936 | Thoma | 60/464 |
| 2,157,707 | 5/1939 | Keel | 60/461 X |
| 2,927,429 | 3/1960 | Carlson | 60/465 |
| 2,961,829 | 11/1960 | Weisenbach | 60/464 |
| 3,625,007 | 12/1971 | Herndon | 91/420 X |
| 3,866,421 | 2/1975 | Kersten et al | 60/456 |

Primary Examiner—Edgar W. Geoghegan
Attorney, Agent, or Firm—William N. Hogg

[57] ABSTRACT

A mixed loop hydrostatic transmission circuit for use principally with orbit, gear, vane and other non-piston type motors, which generate contaminants making them less suitable for applications using conventional closed loop hydrostatic transmission circuits. The mixed loop hydrostatic transmission drive retains the precise load control and high efficiency of a closed loop system, while introducing the benefits of contamination control of open loop hydrostatic transmission circuits. While maintaining the speed of the motor proportional to the output flow of the pump, both in positive and regenerative modes of operation, the full flow of fluid is diverted from the motor to the reservoir, while the full flow of fluid, required by the pump, is supplied directly from the system reservoir.

38 Claims, 5 Drawing Figures

HYDROSTATIC TRANSMISSION MIXED LOOP SYSTEM

BACKGROUND OF THE INVENTION

This invention relates generally to hydrostatic transmission drives. The term hydrostatic transmission is usually associated with highly developed and highly specialized components of closed loop systems, principally intended for precise control of a single load. In a closed loop system, fluid at a very high rate of flow circulates from the pump to the motor and back to the pump again, with only a comparatively small volume of oil being diverted from this closed loop for cooling purposes. Since in such a system any contamination in the loop will produce wear which in turn will produce more contamination, only the types of units generating the least amount of contamination have been successfully used, these having been piston-type pumps and motors, working in a pressurized circuit with a number of specialized accessories.

There is a large family of hydraulic motors of the non-piston type, which either due to their unique operating characteristics, low cost, or some other special features, are produced in very large quantities and used in open loop type hydrostatic transmission circuits, usually with a fixed displacement type pump. The control of the load in such a system is accomplished by means of throttling type direction control valves. Although usually the load control in such systems is not precise and the systems are inefficient, they are inexpensive and lend themselves to control not only of a single load, but a number of loads. The open loop system is also widely used for another, less obvious reason. Some of these high torque, low speed orbit-type hydraulic motors, some of the vane motors, and vane and gear pumps shed contaminants at a comparatively high rate. In an open loop circuit the full quantity of fluid is introduced into the pump from the reservoir, through suction filter or strainer, supplied to the motor and delivered from the motor back directly to the reservoir, usually through a return line filter. In this way, not only is the contamination generated by the motor never introduced directly into the pump inlet, but also contamination generated by the pump can pass only once through the motor. A mixed loop hydrostatic transmission system, according to this invention, retains the contamination free characteristics associated with the open loop circuit while retaining precise control of the closed loop hydrostatic transmission system.

SUMMARY OF THE INVENTION

It is therefore a principal object of this invention to provide a new and improved mixed loop hydrostatic transmission system which retains the control characteristics of a closed loop system while providing contamination free operation of an open loop system.

Another object of this invention is to provide an improved mixed loop hydrostatic transmission system which provides an essentially open loop system with motor response proportional to the quantity and direction of pump flow.

It is another object of this invention to provide an improved mixed loop hydrostatic transmission system, which in an essentially open loop system provides complete synchronization between system pump and motor by throttling the fluid delivered from the motor exhaust.

It is a further object of this invention to provide an improved mixed loop hydrostatic transmission system which synchronizes pump and motor in an essentially open loop system while transmitting a positive load, and which permits motor free wheeling operation while transmitting negative regenerative type load.

It is a further object of this invention to provide an improved mixed loop hydrostatic transmission system which, while using an essentially open loop circuit, induces the full flow replenishment of the pump inlet fluid, by utilizing an inlet pressure boosting stage.

It is a further object of this invention to provide an improved mixed loop hydrostatic transmission system, providing accurate control coupling of pump and motor of a closed loop hydrostatic transmission circuit, while permitting the use of fluid motors which generate contaminants.

Briefly, the foregoing and other additional objects and advantages of this invention are accomplished by providing a novel mixed loop hydrostatic transmission system, constructed according to the present invention, for use in hydrostatic transmission drives. A fluid pump and a fluid motor are coupled by a mixed loop hydrostatic transmission system in such a way that they are synchronized while normally full flow from the pump is supplied to the fluid motor, the full flow from the fluid motor is supplied through an outlet filter to the system reservoir, and an identical amount to fluid flow is supplied from the system reservoir to the fluid pump by an inlet pressure boosting stage. In this way the contaminants generated by the fluid motor are never introduced into pump inlet.

DESCRIPTION OF THE PREFERRED EMBODIMENT

Figure 1:
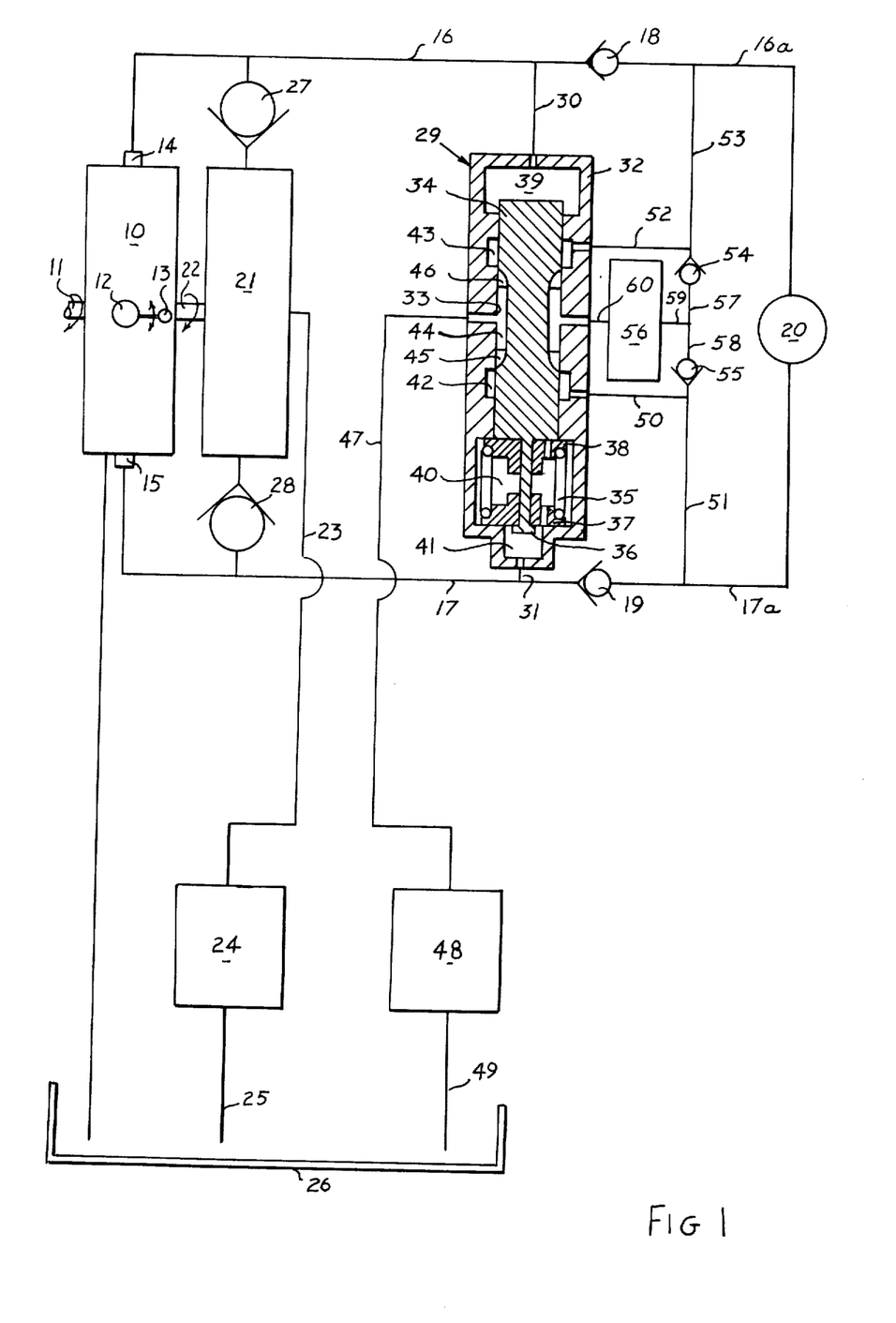
FIG. 1 is a diagrammatic representation of a mixed loop hydrostatic transmission system, equipped with a fluid bypass and fluid throttling synchronizing valve.

Referring now to the drawings, and for the present to FIG. 1, a variable flow overcenter type pump generally designated as 10 is driven through shaft 11 by a prime mover (not shown) and is equipped with a flow changing mechanism 12, operated by a control lever 13. As is well known in the art, counterclockwise movement of the control lever 13 from its neutral zero flow position as shown in FIG. 1 will cause proportionally increasing flow supplied by the variable flow pump 10 to a pump port 14. Conversely, clockwise movement of the control lever 13 from its neutral position will induce proportionally increasing flow supplied by the variable flow pump 10 to a pump port 15. The pump ports 14 and 15 are connected through fluid conducting lines 16 and 17, check valves 18 and 19, and fluid conducting lines 16a and 17a to a fluid motor 20.

A pump inlet pressure booster stage 21, driven by the shaft 11 through variable flow pump 10, and a shaft 22, is connected by suction line 23, a suction strainer 24, and suction line 25 to system reservoir 26. The inlet pressure booster stage 21 is also phased by check valves 27 and 28 with the fluid conducting lines 16 and 17 respectively.

A bypass brake valve, generally designated as 29, is connected by lines 30 and 31 with fluid conducting lines 16 and 17. The bypass brake valve 29 has a housing 32, equipped with a bore 33, guiding a bypass brake spool 34. The bypass brake spool 34 is biased upwardly (as viewed in FIG. 1) toward the position as shown by a spring 35. The spring 35 is disposed between spring retainer 37 and spring retainer 38. During upward movement of the bypass brake spool 34, a stop 36 formed on the end thereof will engage the spring retainer 37 compressing the spring 35. During downward movement of the bypass brake spool 34, the stop 36 will disengage from spring retainer 37 and the spring retainer 38 engaged by bypass brake spool 34, will compress the spring 35.

The housing 32 defines spaces 39, 40 and 41 and annular grooves 42 and 43. The space 39 directly communicates with the end of the bypass brake spool 34. The space 41 communicates with the end of the bypass brake spool 34 through drillings (unnumbered) in spring retainers 37 and 38, not shown. A reduced center portion of the bypass brake spool 34 defines in bore 33 an annular space 44. Throttling grooves 45 and 46 are located on the bypass brake spool 34, between annular grooves 42 and 43 and annular space 44 respectively. These grooves 45 and 46 are arcuate, radially spaced slots as is well known in the art. The annular space 44 is connected by a return line 47, outlet filter 48 and return line 49 with the system reservoir 26. The annular groove 42 is connected through lines 50 and 51 to the fluid conducting line 17a. The annular groove 43 is similarly connected through lines 52 and 53 with the fluid conducting line 16a. Check valves 54 and 55 provide unidirectional flow between lines 53 and 51 and a system relief valve 56 is connected by lines 58, 57 and 59. The system relief valve 56 is connected through line 60 with annular space 44 of the bypass brake valve 29 and in a result through return line 47, outlet filter 48 and return line 49 to system reservoir 26. Counterclockwise movement of the control lever 13 will induce a pressurized flow from the variable flow pump 10 through pump port 14, to fluid conducting line 16. In a well known manner, the check valve 18 will open, supplying the pressurized fluid through fluid conducting line 16a to the fluid motor 20. Simultaneously the pressurized fluid from fluid conducting line 16 will be transmitted through line 30 to space 39, where reacting on the cross sectional area of bypass brake spool 34 will cause the spool to move downward (as viewed in FIG. 1) against biasing force of the spring 35, connecting annular groove 43 with annular space 44. As a result the downstream port of the fluid motor 20 will be directly connected, through fluid conducting line 17a, lines 51 and 50, annular groove 42, annular space 44, return line 47, outlet filter 48 and return line 49 with system reservoir 26. The check valve 19, in a well known manner, will block the flow between the conducting lines 17a and 17. The pressurized fluid conducting line 16a and therefore inlet of the fluid motor 20 is also connected through line 53, the check valve 44 and lines 57 and 59 to the system relief valve 56.

Inlet pressure booster stage 21 is capable of supplying full suction oil requirements of the variable pump 10. Pressure differential developed between the inlet pressure booster stage 21 and fluid conducting line 17, which with fluid conducting line 16 being pressurized becomes suction line of the variable pump 10, will open check valve 28. Then all the suction flow requirements of the variable flow pump 10 will be supplied from the inlet pressure booster stage 21, which through suction line 23, the suction strainer 24 and suction line 25 is connected to the system reservoir 26.

As long as the fluid motor 20 absorbs the power supplied by the variable flow pump 10, all of the flow from the variable flow pump 10 will be supplied to the fluid motor 20, all of the flow from the fluid motor 20 will be diverted to the system reservoir 26, and all of the inlet flow requirements of the variable flow pump 10 will be supplied by the inlet pressure booster stage 21 from the system reservoir 26. If due to the resistance of fluid motor 20 the pressure in the fluid conducting lines 16 and 16a would exceed the setting of the system relief valve 56, the system relief valve 56 will open and part of the fluid flow from the variable flow pump 10 will be bypassed through line 53, check valve 54, lines 57 and 59, relief valve 56, annular space 44, return line 47, outlet filter 48 and return line 49 to the system reservoir 26.

An application of positive external driving torque to the fluid motor, or a reduction in pump flow will reduce the discharge pressure of the variable flow pump 10 to a level at which the spring 35 of the bypass brake valve 29 will start to return the bypass and brake spool 34 to its neutral position. Throttling groove 45 will start increasing the resistance to flow between annular groove 42 and annular space 44, throttling the return flow and providing a braking effect on the fluid motor 20. The throttling groove 45 has a variable area, permitting variation in resistance to the outlet flow of the fluid motor 20, with change in the bypass spool position. The magnitude of the braking effect and therefore the pressure in line 17a is limited by the system relief valve 56, which is connected to the source of pressure in fluid conducting line 17a through line 51, check valve 55 and lines 58 and 59. In a well known manner, the check valve 54 will close isolating line 57 from line 53. The braking effect, applied to the fluid motor 20, will lower its speed to a point, at which the flow requirements of the fluid motor 20 will match exactly the flow output of the variable flow pump 10. The resulting increase in the discharge pressure of the variable flow pump 10 will shuttle back the bypass brake spool 34 against bias of the spring 35 and connect the outlet of the fluid motor 20 with the system reservoir 26.

A very sudden large reduction in the flow of the variable flow pump 10 will instantly lower the discharge pressure to a level at which the pressure differential between the inlet pressure booster stage 21 and fluid conducting line 16 will open check valve 27, connecting the inlet pressure booster stage 21, through check valve 18 and fluid conducting line 16a to the inlet of the fluid motor 20. The booster stage supplies pressure fluid at a minimal pressure, enough to prevent cavitation but well below the pressure equivalent of the spring 35, and the normal output pressure of the pump 10. The inlet requirements of the fluid motor 20 will then be supplied by the combined flow from the variable flow pump 10 and from the inlet pressure boosting stage 21. At the same time the resulting low pressure in the fluid conducting line 16, line 30 and space 39 will permit the bypass brake spool 34 to return to its neutral position, under action of the spring 35. With bypass brake spool 34 in its neutral position and the passage between annular groove 42 and annular space 44 fully blocked, full outlet flow of the motor will be bypassed through line 51, the check valve 55, lines 58 and 59 and the system relief valve 56 to the system reservoir 26, decelerating the fluid motor 20 at a maximum rate until the flow requirements of the fluid motor 20 match exactly the output flow of the variable pump 10. Then, as previously described, the pressure in the fluid conducting line 16 will rise and the bypass brake spool 34 will reconnect the outlet of the fluid motor 20 will the system reservoir 26.

In this way the mixed loop hydrostatic transmission circuit of FIG. 1 will maintain the output of fluid motor 20, proportional to flow output of the variable flow pump 10, within the range of positive driving effort and the full range of braking effort up to the maximum value, as determined by the setting of the system relief valve 56.

Because of the pressure developed in the inlet pressure booster stage 21 under normal operating conditions, no cavitation can take place in any part of the circuit.

The mixed loop system, as described above, is completely symmetrical since it performs in an identical way in both directions of the flow from the variable flow pump. Movement of the control lever 13 of the variable flow pump 10 from its neutral position in a clockwise direction will reverse the pump flow and pressurize the fluid conducting line 17. Fluid under pressure will then be transmitted through check valve 19 and fluid conducting line 17a to fluid motor 20, which in a well known manner, will reverse its direction of operation, the fluid conducting line 17a being the motor inlet line. The fluid pressure conducted through line 31 to space 40 will react against the cross-sectional area of the bypass brake spool 34 and shuttle it upwards, against biasing force of the spring 35, connecting annular groove 43 with annular space 44 through throttling grooves 46. This action will connect the fluid conducting line 16a, leading from the fluid motor 20 through lines 53 and 52, annular grove 43, annular space 44, return line 47, outlet filter 48 and return line 49, to the system reservoir 26. Under action of the pressure differential existing between the inlet pressure booster stage 21, and fluid conducting line 16, the check valve 27 will open and the inlet pressure boosting stage 21 will supply full inlet flow requirements of the variable flow pump 10. Fluid to inlet pressure booster stage will be supplied from system reservoir 26 through suction line 25, suction strainer 24, and suction line 23.

Since as previously stated the arrangement of the control components of the mixed loop hydrostatic transmission system is completely symmetrical, all the other functions of braking and synchronization of speed between the fluid motor 20 and the variable flow pump 10 will be identical in both directions of rotation of fluid motor 20 and on each side of center of the flow changing mechanism 12 of the variable flow pump 10.

The performance characteristics of the mixed loop circuit, as described above, are exactly the same as those of a closed loop hydrostatic transmission, while full outlet flow of fluid motor 20 and full flow through the system relief valve 56 is being delivered through the outlet filter 48, to the system reservoir 26 and full suction flow for the pump is being supplied from the system reservoir through the suction strainer 24. Therefore all the contaminants generated by the fluid motor 20 are trapped in the outlet filter 48 and cannot reenter the loop, and all the contaminants generated by the pump can only pass through the motor once.

With variable flow pump 10 brought into zero flow position, or with the transmission at rest, the bypass brake spool, biased by the spring 35, automatically blocks both fluid motor ports to provide so-called parking brake effect. Under these conditions, any leakage from the fluid motor 20 due to braking torque being applied to the motor is replenished from the system reservoir 26, depending on torque direction, either through check valve 27 or 28, through either stationary or revolving inlet pressure booster stage 21.

Figure 2:
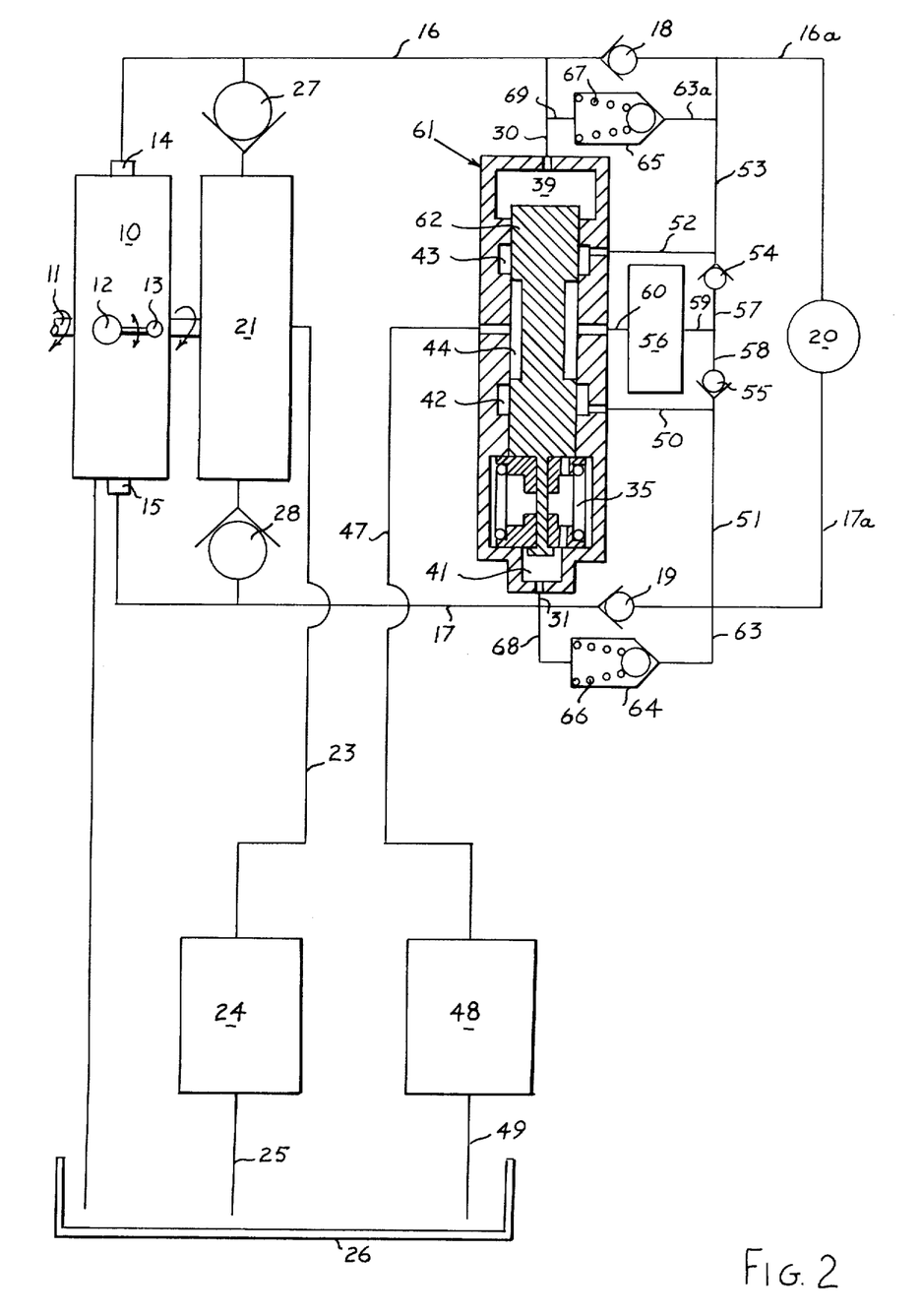
FIG. 2 is a diagrammatic representation of a mixed loop hydrostatic transmission system, equipped with a fluid bypass valve, which permits full fluid exchange during transmission of positive load and which reverts to closed loop hydrostatic transmission system, in regenerative mode of operation.

Referring now to FIG. 2, a different type of mixed loop hydrostatic transmission drive circuit is shown. All the basic system components of FIG. 2 are identical to those of FIG. 1, with two exceptions. A bypass valve 61 differs from bypass brake valve 29 in that the throttling grooves 45 have been removed from the valve spool and two spring loaded check valves 64 and 65 have been connected in parallel circuit with the check valves 18 and 19. The spring loaded check valves 64 and 65 permit unidirectional fluid flow in the opposite direction to that of check valves 18 and 19.

As long as the fluid motor 20 absorbs the power supplied by the variable flow pump 10, the performance of mixed loop hydrostatic drives of FIGS. 1 and 2 is identical. The operation of those two systems, however, varies distinctly when the fluid motors are subjected to braking action or when they are subjected to regenerative loads.

With the control lever 13 turned counter-clockwise and the fluid conducting line 16 subjected to pressure, as previously described when referring to FIG. 1, pressurized fluid flow is supplied through check valve 18 and line 16a to fluid motor 20. Due to the direction of the fluid flow, the spring loaded check valve 65 remains closed. Fluid under pressure, conducted through line 30 to space 39, shifts the valve spool 62 downwards against bias of spring 35, cross-connecting annular groove 42 with annular space 44. The exhaust flow from the fluid motor 20 is transmitted through the fluid conducting line 17a, lines 51 and 50, annular groove 42, annular space 44, the return line 47, the outlet filter 48 and the return line 49 to the system reservoir 26. The fluid conducting line 17 is subjected to inlet pressure of the variable flow pump 10, supplied through check valve 28, by inlet pressure booster stage 21. Depending on the characteristics of the inlet pressure boosting stage 21, the pressure in the fluid conducting line 17 may be below atmospheric pressure. The spring loaded check valve 64 is subjected to a pressure differential existing between fluid conducting lines 17a and 17. The fluid conducting line 17a is subjected to pressure caused by the resistance to flow of the motor exhaust fluid on its way to the system reservoir, including the resistance of the outlet filter 48. The preload in the spring 66 is so selected that it will provide a higher opening pressure differential than the highest pressure differential that could exist between fluid conducting lines 17a and 17 with the fluid motor exhaust fluid being bypassed through the bypass valve 61 to the system reservoir 26.

Sudden reduction of the output flow of the variable flow pump 10, in respect to the flow requirements of the fluid motor 20, will lower the system pressure in the fluid conducting line 16. The check valve 27 will open, connecting the inlet pressure boosting stage 21 to motor inlet to satisfy higher inlet flow demand of the fluid motor 20 than the variable flow pump 10 can supply. Simultaneously the valve spool 62, activated by spring 35, will return to its neutral position, isolating annular groove 42 from annular space 44. The outlet of the fluid motor 20 will become isolated from the system reservoir 26. As a result, rising pressure in the fluid conducting line 17a and line 63 will overcome preload of spring 66, of spring loaded check valve 64, permitting flow from outlet of the fluid motor 20 through fluid conducting line 17 to the inlet port 15 of the variable flow pump 10. In a well known manner, the variable flow pump 10 will become a fluid motor, feeding the power through shaft 11 back into the prime mover and thus providing a braking effect for the fluid motor 20.

If during the braking operation the system pressure exceeds the setting of the system relief valve 56, as previously described, part of the flow from the fluid motor 20 will be diverted through the system relief valve 56 to the system reservoir 26, the fluid motor 20 being decelerated at a maximum rate. Under these conditions the inlet pressure booster stage 21 will supply through check valve 27, into fluid conducting line 16 and therefore into the motor inlet, a flow consisting of the flow through the relief valve 56 and the system leakage.

Once the resulting braking torque has lowered the speed of the fluid motor 20 to a point at which the motor flow requirements match exactly the flow output of the variable flow pump 10, the resulting increase in the outlet pressure of the variable flow pump 10 will shift the bypass valve 61 connecting, in a manner as previously described, the outlet of the fluid motor 20 with the system reservoir 26.

With the variable flow pump 10 brought into zero flow position, or with the transmission at rest, the valve spool 62 biased by spring 35 automatically blocks both fluid motor ports to provide so-called parking brake effect. Under these conditions any leakage from the fluid motor 20 due to braking torque being applied to the motor is replenished from the system reservoir 26, depending on the torque direction, either through check valve 27 or 28 and through either stationary or revolving inlet pressure booster stage 21.

Since, as previously stated, the arrangement of the control components of the mixed loop hydrostatic transmission system is completely symmetrical, all the other functions of braking and synchronization of speed between the fluid motor 20 and the variable flow pump 10 will be identical in both directions of rotation of fluid motor 20 and on each side of center of the flow changing mechanism 12 of the variable flow pump 10.

As long as fluid motor 20 absorbs the power supplied by the pump, all the flow from fluid motor will be directed to the system reservoir and all the inlet flow requirements of the variable flow pump will be supplied by the inlet pressure booster stage from the reservoir, the system basically utilizing the principle of open loop circuit. However, once the inlet flow requirement of the fluid motor 10 momentarily exceeds the flow output of the variable flow pump, all of the flow from the motor will be supplied directly to the variable flow pump inlet, providing dynamic braking of the system, the system reverting automatically to the principle of closed loop circuit.

In a typical hydrostatic transmission circuit, driving even a partially absorptive load, only a very small percentage of time is used in dynamic braking. Therefore, when using the mixed loop circuit of FIG. 2, the time used in open loop operation will be many times greater than that used in the closed loop. In the same proportion the effect of the contaminants generated by the motor on the life of the pump will be reduced. There exists still another factor which will further reduce the wear of the pump working in this circuit. During each switch from open to closed loop circuit and back again the system is completely flushed with clean oil, the build-up of contaminants within the loop never reaching a significant level.

Figure 3:
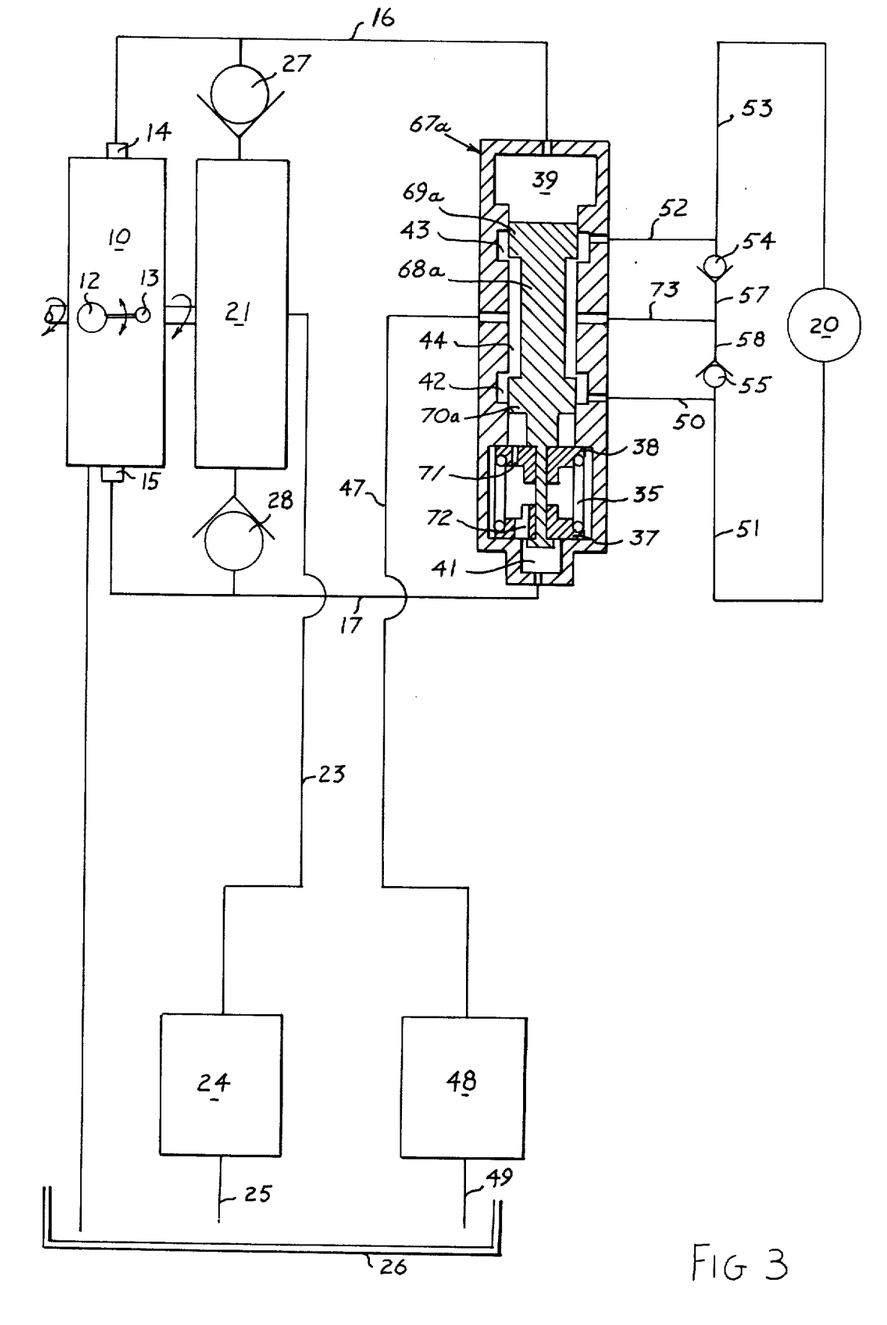
FIG. 3 is a diagrammatic representation of a mixed loop hydrostatic transmission drive, equipped with a fluid bypass valve, which permits full fluid exchange during transmission of a positive load and which permits free wheeling of the motor in regenerative mode of operation.

Referring now to FIG. 3, a different type of mixed loop hydrostatic transmission drive circuit is shown. Most of the basic system components of FIG. 3 are identical to those of FIGS. 1 and 2. A bypass float valve, generally designated as 67a, is similar to the bypass valve 61 of FIG. 2. The spool lands 69a and 70a, however, have been shortened to cross-connect, in neutral position of float spool 68a, annular groove 42, annular space 44 and annular groove 43. Large flow passages 71 and 72 have been provided in spring retainers 37 and 38. Because of the system float characteristics the system relief valve of FIG. 2 has been eliminated in FIG. 3 and substituted by line 73.

As long as the fluid motor 20 absorbs the power supplied by the variable flow pump 10, the performance of the mixed loop hydrostatic transmission drive of FIGS. 1, 2, and 3 is identical. The operation of the drive system of FIG. 3 differs distinctly from those of FIGS. 1 and 2, when fluid motor is subjected to braking action, or when it is subjected to a regenerative type of load.

With the control lever 13 turned counter-clockwise and the fluid conducting line 16 and space 39 subjected to pressure, the float spool 68a will be shifted downwards, against bias of spring 35, cross-connecting space 39 with annular groove 43 and lines 52 and 53. The outlet port 14 of the variable flow pump 10 then becomes directly connected to inlet port of the fluid motor 20, the check valve 54 remaining in its closed position. The downward shift of the float spool 68a isolates annular space 44 from annular groove 43, while maintaining annular space 44 connected to annular groove 42. The outlet flow from the fluid motor 20 is transmitted through lines 51 and 50, annular groove 42, annular space 44, return line 47, outlet filter 48 and return line 49 to the system reservoir 26. In a manner as previously described, when referring to FIGS. 1 and 2, full suction flow of the variable flow pump 10 will be supplied from the system reservoir 26, through the suction strainer 24, suction line 23, the inlet pressure booster stage 21, check valve 28 and fluid conducting line 17.

With the control lever 13 turned from its neutral position in a clockwise direction, the fluid conducting line 17 and space 41 will become pressurized and the float spool 68a will be shifted upwards, connecting space 41 through flow passages 72 and 71 to the annular groove 42. While the fluid motor 20 absorbs the power supplied from variable flow pump, the remaining series of operations throughout the circuit will be the same, as already described, when the pump flow was being delivered into fluid conducting line 16.

With fluid conducting line 16 pressurized, a sudden reduction in flow of the variable flow pump 10, in respect to flow requirement of the fluid motor 20, will lower the system pressure in fluid conducting line 16 to a level necessary to maintain the float spool 68a open against the biasing force of spring 35. Additional flow to the inlet of the fluid motor 20 will then be supplied from the motor outlet through lines 51 and 50, annular groove 42, annular space 44, lines 73 and 57 and the check valve 54, the check valve 55 remaining closed. Part of the outlet flow from fluid motor 20, equivalent in volume to the fluid flow, delivered by the variable flow pump 10, will be diverted to the system reservoir 26 through return line 47, outlet filter 48 and return line 49. Under these conditions the fluid motor 20 will coast until, due to dropping speed, its inlet flow requirements will match exactly the output flow of variable flow pump 10. The check valve 54 will then close and the normal power absorption cycle of the fluid motor 20 will begin.

With the variable flow pump 10 brought into zero flow position, or with the transmission at rest, the float spool 68a, biased by spring 35, automatically cross-connects both motor ports, to provide so-called motor floating effect. Since check valves 54 and 55 connect each side of the fluid motor 20 to the system reservoir 26, no cavitation of the motor can take place.

Figure 4:
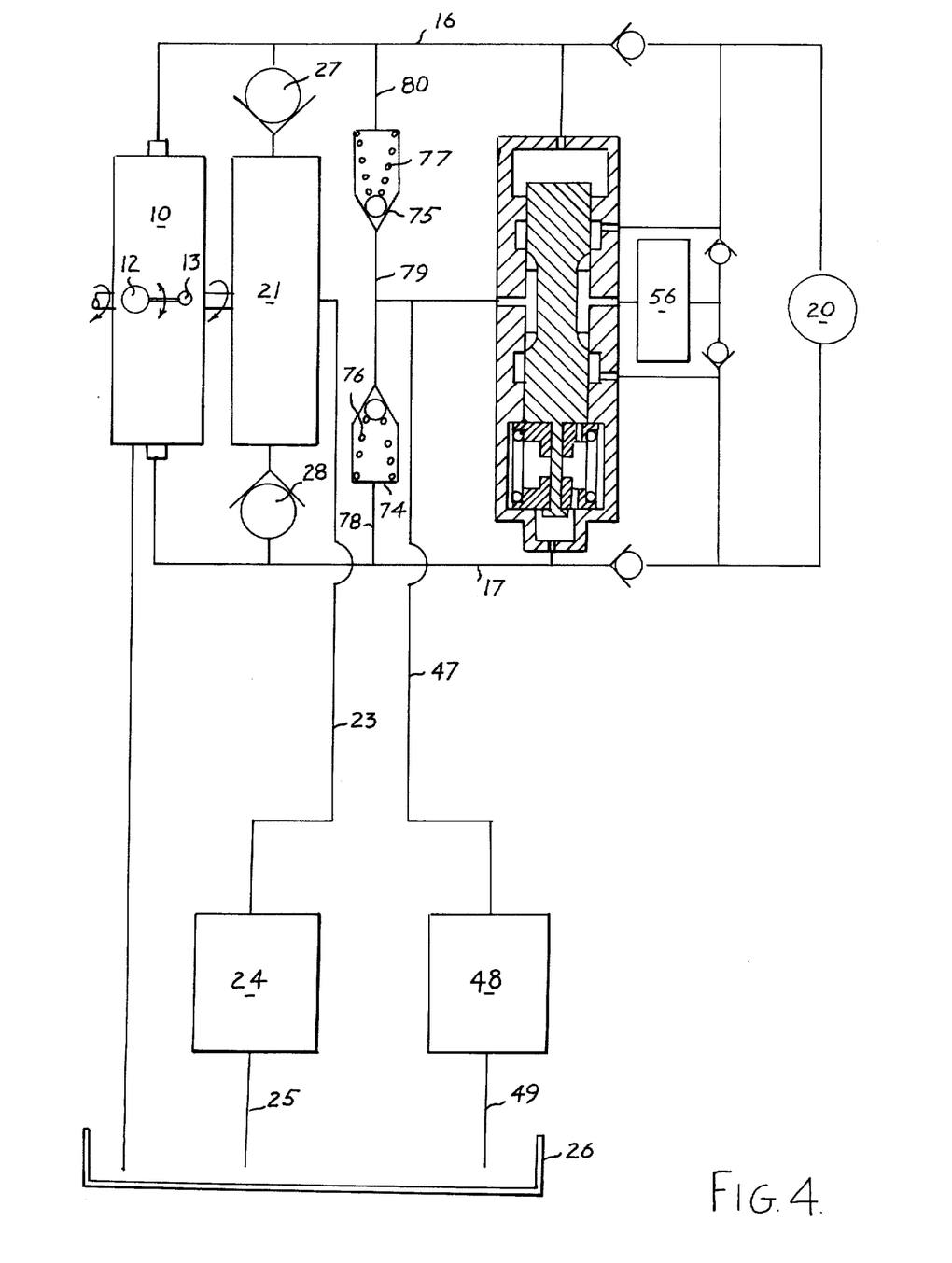
FIG. 4 is a diagrammatic representation of a mixed loop hydrostatic transmission of FIG. 1, but with provision of an anticavitational valve for system protection against cavitaton.

Referring now to FIG. 4, the drive arrangement of FIG. 4 is identical to that of FIG. 1 with the exception that two anti-cavitational valves 74 and 75 have been added. Anti-cavitational valve 75 is connected to fluid conducting line 16 by line 80 and to return line 47 by line 79. The anti-cavitational valve 74 is connected to fluid conducting line 17 by line 78 and to return line 47 by line 79, which also connects the anti-cavitational valves 74 and 75 to each other. The biasing force of springs 76 and 77 is so selected that the anti-cavitational valves will open once the pressure in fluid conducting lines 16 or 17 falls below atmospheric pressure level. Additional fluid flow will then be supplied to either line from outlet of the fluid motor 20 or from the system reservoir 26 to prevent cavitation. As will be seen by those skilled in the art, line 79 can be directly connected (not through filter 48) to the system reservoir 26 so that clean make up fluid is suppled to fluid conducting lines 16 and 17.

It is to be understood that normally all of the suction flow requirements of the variable flow pump 10 would be supplied by the inlet pressure booster stage 21, and the use of these anti-cavitational valves is justified only under the most unusual system operating conditions such as, for example, in a system with very viscous fluid where the apparatus is subjected to high speed cold starts.

Figure 5:
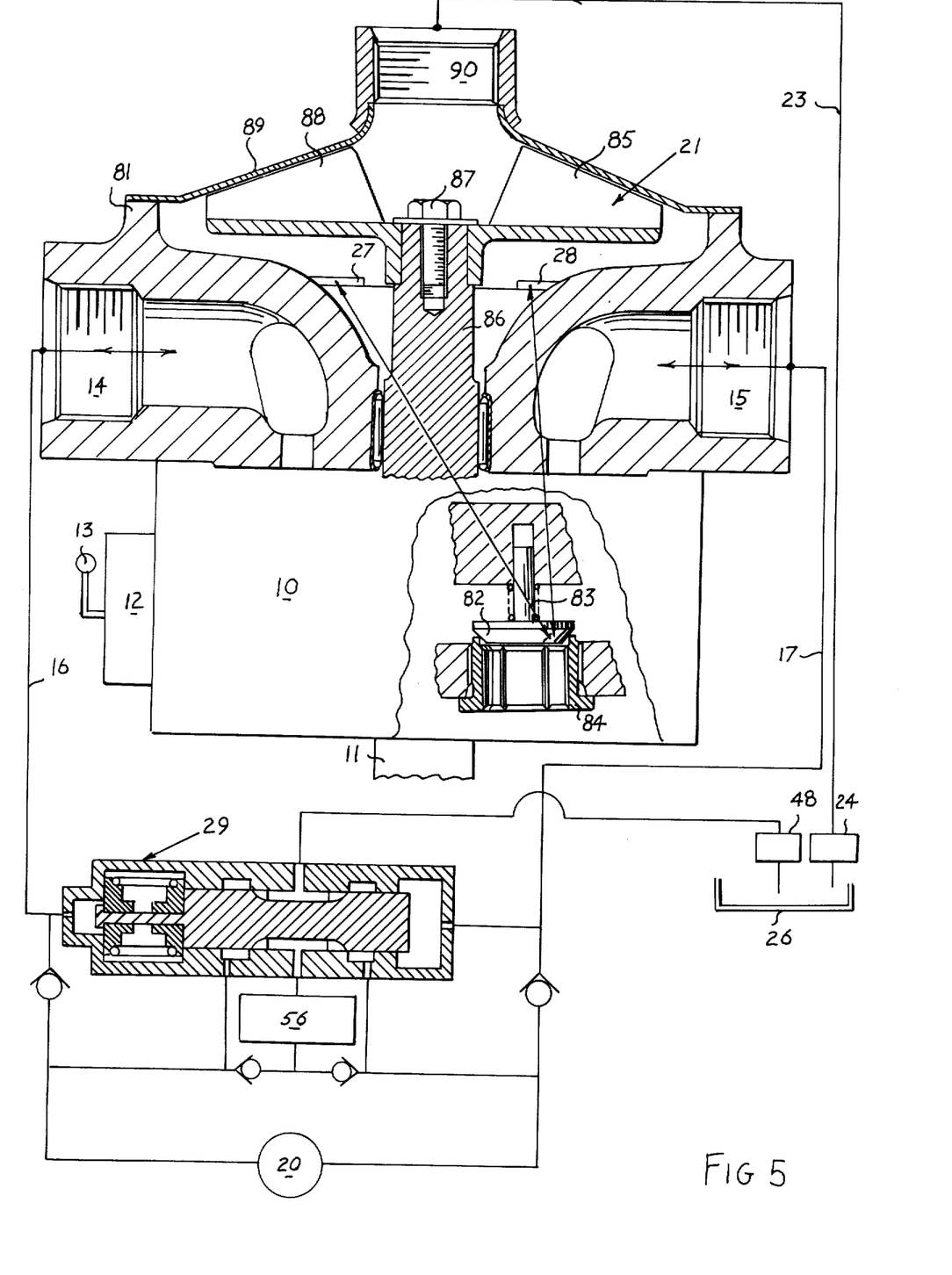
FIG. 5 is a diagrammatic representation of a mixed loop hydrostatic transmission of FIG. 1, with sectional view of overcenter variable pump port plate, equipped with centrifugal booster state and main flow check valves.

Referring now to FIG. 5, the variable flow pump 10 driven through shaft 11 by a prime mover (not shown) has the overcenter flow changing mechanism 12 operated by the control lever 13. The variable flow pump 10 is equipped with a port plate 81 having pump ports 14 and 15 and check valves 27 and 28, details of the construction of which are shown in a separate broken view. Check valves 27 and 28, located between pump ports 14 and 15 and the inlet pressure booster stage, generally designated as 21, are composed of a poppet 82, a spring 83 and a seat 84, operation of such check valves being well known in the art.

The inlet pressure booster stage 21 is shown as an integral part of the variable flow pump 10 and consists of a centrifugal impeller 85 mounted on an extension 86 of the pump shaft 11 and retained in position by a fastener 87. The centrifugal impeller 85 and the extension 86 are provided with a suitable drive key (not shown). The centrifugal impeller 85 with its blades 88 works against a shroud 89. An inlet port 90 of the inlet pressure booster stage 21 is connected by suction line 23 to the system reservoir 26. In a well known manner, the centrifugal impeller 85 draws fluid from the system reservoir 26 and supplies it at a higher pressure level to the check valves 27 and 28 and therefore to the inlet ports 14 and 15 of the variable flow pump 10.

Although the inlet pressure booster stage, as shown in FIG. 5, utilizes the principle of centrifugal pump equipped with centrifugal impeller, any other type of turbine or low pressure fixed or variable displacement pump could be used equally well. Although the inlet pressure booster stage and the check valves are shown as an integral part of the variable flow pump, they can be individually packaged and independently driven.

The fluid conducting lines 16 and 17 from pump ports 14 and 15 supply a hydrostatic transmission mixed loop system, identical to that shown in FIG. 1, the operation of which has already been fully described.

Although preferred embodiments of this invention have been shown and described in detail it is recognized that the invention is not limited to the precise forms and structure shown, and various modifications and rearrangements as will readily occur to those skilled in the art upon full comprehension of this invention may be resorted to without departing from the scope of the invention as defined by the claims.

What is claimed is:

1. A fluid power transmission and control system having a variable delivery fluid pump and a fluid motor, said pump and said motor each having fluid conducting port means and a system reservoir, the improvement which comprises, a fluid distributing and control system interposed between said fluid conducting port means of said pump and said motor, said distributing and control system including a suction fluid conducting means interconnecting said pump and said reservoir to deliver from said reservoir full suction flow requirements of said variable delivery pump, means for phasing full suction flow requirements of said variable delivery pump transmitted through said suction fluid conducting means to a low pressure fluid conducting port means of said pump, a motor exhaust fluid diverting means to selectively divert full flow of motor exhaust fluid to the reservoir, a motor speed synchronizing means to synchronize the motor speed with the fluid flow from the pump, said motor exhaust diverting means and said motor speed synchronizing means including means to operate said motor exhaust diverting means and said motor speed synchronizing means in response to the pressure of the fluid supplied from the pump to the motor.

2. A fluid power transmission and control system as set forth in claim 1 wherein said motor exhaust fluid diverting means has a valve means to direct full flow of motor exhaust fluid to said reservoir, said valve means includes an activating means to activate said valve means when pressure of fluid supplied from said pump to said motor increases to a certain predetermined value.

3. A fluid power transmission and control system as set forth in claim 1 wherein said motor speed synchronizing means includes motor exhaust fluid throttling means, said fluid throttling means having means to activate said fluid throttling means when pressure of fluid supplied from said pump to said motor decreases below a certain predetermined value.

4. A fluid power transmission and control system as set forth in claim 1 wherein said means for phasing full suction flow requirements of said variable delivery pump transmitted through said suction fluid conducting means includes full pump flow check valve means to connect suction fluid to a low pressure fluid conducting port means of said pump and to isolate said suction fluid conducting means from high pressure fluid conducting port means of said pump.

5. A fluid power transmission and control system as set forth in claim 1 wherein said motor speed synchronizing means has fluid directing means to direct motor exhaust fluid to said pump when pressure of fluid supplied from said pump to said motor decreases below a certain predetermined value.

6. A fluid power transmission and control system as set forth in claim 1 wherein said suction fluid conducting means supplying full suction flow requirements of said variable delivery pump has pressure boosting means to increase pressure of suction fluid supplied from said reservoir to said pump.

7. A fluid power transmission and control system as set forth in claim 2 wherein anticavitation check valve means are interposed between outlet of said valve means and said pump fluid conducting port means.

8. A fluid power transmission and control system as set forth in claim 2 wherein relief valve means is interposed between said motor ports and said valve means.

9. A fluid power transmission and control system having a variable delivery fluid pump and a fluid motor, said pump and said motor each having fluid conducting port means and a system reservoir, the improvement which comprises, a fluid distributing and control system interposed between said fluid conducting port means of said pump and said motor, said distributing and control system including suction fluid conducting means interconnecting said pump and said reservoir to deliver from said reservoir full suction flow requirements of said variable delivery pump, means for phasing full suction flow requirement of said variable delivery pump transmitted through said suction fluid conducting means to a low pressure fluid conducting port means of said pump, motor exhaust fluid diverting means to selectively connect full flow of the motor exhaust fluid to the reservoir, and means to selectively cross connect fluid flowing into and out of said motor, said motor exhaust diverting means and said means to cross connect having operating means responsive to pressure of fluid supplied from said pump to said motor.

10. A fluid power transmission and control system as set forth in claim 9 wherein said motor exhaust fluid diverting means has valve means to direct full flow of motor exhaust fluid to said reservoir, said valve means having activating means to activate said valve means when pressure of fluid supplied from said pump to said motor increases to a certain predetermined value.

11. A fluid power transmission and control system as set forth in claim 9 wherein said means for phasing full suction flow requirements of said variable delivery pump transmitted through said suction fluid conducting means includes full pump flow check valve means to connect suction fluid to a low pressure fluid conducting port means of said pump and to isolate said suction fluid conducting means from high pressure fluid conducting port means of said pump.

12. A fluid power transmission and control system as set forth in claim 9 wherein said suction fluid conducting means supplying full suction flow requirements of said variable delivery pump has pressure boosting means to increase pressure of suction fluid supplied from said reservoir to said pump.

13. A fluid power transmission and control system as set forth in claim 9 wherein anticavitation check valve means are interposed between outlet of said valve means and said pump fluid conducting port means.

14. A fluid power transmission and control system comprising a combination of
 a. a variable delivery fluid pump;
 b. pump control to vary pump delivery;
 c. a fluid motor connected to a load;
 d. a fluid reservoir;
 e. fluid conducting means to conduct fluid flow from the variable delivery pump to the fluid motor;
 f. fluid conducting means to connect flow from the fluid motor to the variable delivery fluid pump and the fluid reservoir;
 g. suction fluid conducting means to connect the fluid reservoir and the variable delivery fluid pump to deliver from said reservoir full suction flow requirements of said variable delivery pump;
 h. check valve means to connect suction fluid conducting means with low pressure zone of variable delivery pump and isolate said suction fluid conducting means from high pressure zone of said variable delivery pump;
 i. fluid distributing means responsive to pressure of fluid delivered from the pump to the motor and operable to divert full fluid flow from said motor to said reservoir when said pressure increases to a given selected value;
 j. means to regulate speed of said motor proportionally to fluid flow delivered from said pump when the pressure of fluid flow to the motor drops below a predetermined value.

15. The combination of claim 14 including means to limit pump pressure to a predetermined maximum value by diverting fluid flow from said pump to the reservoir.

16. The combination of claim 14 including anticavitation check valve means effective when pressure of the fluid delivered from pump to motor drops below a certain predetermined value to bypass fluid flow out of said motor to said fluid conducting means conducting fluid flow from said pump to said motor.

17. A fluid power transmission and control system comprising the combination of
 a. a variable delivery fluid pump;
 b. pump control to vary pump delivery;
 c. a fluid motor connected to a load;
 d. a fluid reservoir;

e. fluid conducting means to conduct fluid flow from the variable delivery pump to the fluid motor;

f. fluid conducting means to connect flow from the fluid motor to the variable delivery pump and the fluid reservoir;

g. suction fluid conducting means arranged to deliver full suction flow requirements of said variable delivery pump connecting the fluid reservoir and the variable delivery fluid pump;

h. check valve means to connect full suction flow required by the variable delivery pump carried by suction fluid conducting means with low pressure zone of variable delivery pump and isolate said suction fluid conducting means from high pressure zone of said variable delivery pump;

i. fluid distributing means responsive to pressure of the fluid delivered from the pump to the motor and operable to divert full flow of fluid flow from said motor to said reservoir and effective when said pressure increases to a given selected value;

j. means effective when pressure of fluid flow from pump to motor drops below certain predetermined value to throttle fluid flow from said motor on its way to reservoir to regulate the speed of said motor proportionally to fluid flow delivered from said pump.

18. A fluid power transmission and control system comprising the combination of a. a variable delivery fluid pump driven by a prime mover;

b. pump control to vary pump delivery;

c. a fluid motor connected to a load;

d. a fluid reservoir;

e. fluid conducting means to conduct fluid flow from the variable delivery pump to the fluid motor;

f. fluid conducting means to connect flow from the fluid motor to the variable delivery pump and the fluid reservoir;

g. suction fluid conducting means arranged to deliver full suction flow requirement of said variable delivery pump connecting the fluid reservoir and the variable delivery fluid pump;

h. check valve means to connect full suction flow required by the variable delivery pump carried by suction fluid conducting means with low pressure zone of the variable delivery pump and isolate said suction fluid conducting means from high pressure zone of said variable delivery pump;

i. fluid distributing means responsive to pressure of the fluid delivered from the pump to the motor and operable to divert full flow of fluid flow from said motor to said reservoir and effective when said pressure increases to a given selected value;

j. means effective when pressure of the fluid flow from the pump to the motor drops below a given selected value to direct fluid flow from said motor to said high pressure zone of said pump to regenerate the energy supplied by said motor and feed it back into prime mover.

19. A fluid power transmission and control system comprising a combination of a. a variable delivery fluid pump;

b. pump control to vary pump delivery;

c. a fluid motor connected to a load;

d. a fluid reservoir;

e. fluid conducting means to conduct fluid flow from the variable delivery pump to the fluid motor;

f. fluid conducting means to connect flow from the fluid motor to variable delivery fluid pump and the fluid reservoir;

g. suction fluid conducting means arranged to deliver full suction flow requirements of said variable delivery pump connecting the fluid reservoir and the variable delivery fluid pump;

h. check valve means to connect full suction flow required by the variable delivery pump carried by the suction fluid conducting means with low pressure zone of the variable delivery pump and isolate said suction fluid conducting means from high pressure zone of said variable delivery pump;

i. fluid distributing means responsive to pressure of fluid delivered from the pump to the motor and operable to divert full flow of fluid flow from said motor to said reservoir and effective when said pressure increases to a given selected value;

j. means effective when fluid demand of motor exceeds the fluid delivery of said pump to divert fluid flow out of said motor to fluid flowing into said motor to provide a free wheeling effect.

20. The combination of claim 19 including check valve means in said fluid conducting means between motor and reservoir to provide excess flow required at the motor inlet and to prevent cavitation.

21. A fluid power transmission and control system comprising a combination of a. a variable delivery pump;

b. pump control to vary pump delivery;

c. a fluid motor connected to a load;

d. a fluid reservoir e. fluid conducting means to conduct fluid flow from the pump to the motor;

f. fluid conducting means to conduct flow from the fluid motor to the variable delivery fluid pump and the fluid reservoir;

g. suction fluid conducting means arranged to deliver full suction flow requirements of said variable delivery pump connecting the fluid reservoir and the pump;

h. pressure boosting means supplying full suction flow requirements of said variable delivery pump in said suction fluid conducting means to increase pressure of suction fluid supplied from said reservoir to said pump;

i. check valve means to connect said pressure boosting means supplying full suction flow requirements of said variable delivery pump with low pressure zone of said pump and isolate said pressure boosting means from high pressure zone of said pump;

j. fluid distributing means responsive to pressure of fluid delivered from the pump to the motor and operable to divert full flow of fluid flow from said motor to said reservoir and effective when said pressure increases to a given selected value;

k. means effective when pressure of fluid flow from the pump to the motor drops below a given selected value to regulate the speed of said motor proportionally to the fluid flow delivered from said pump.

22. The combination of claim 21 including means to limit the pump pressure to a predetermined maximum value by diverting fluid flow from said pump to said reservoir.

23. The combination of claim 21 including anticavitation check valve means effective when pressure of the fluid delivered from pump to motor drops below a certain predetermined value to bypass fluid flow out of said motor to said fluid conducting means conducting fluid flow from said pump to said motor.

24. A fluid power transmission and control system comprising the combination of
  a. a variable delivery pump;
  b. pump control to vary the pump delivery;
  c. a fluid motor connected to a load;
  d. a fluid reservoir;
  e. fluid conducting means to conduct fluid flow from the pump to the motor;
  f. fluid conducting means to conduct flow from the fluid motor to the variable delivery fluid pump and the fluid reservoir;
  g. suction fluid conducting means arranged to deliver full suction flow requirements of said variable delivery pump connecting the fluid reservoir and the pump;
  h. pressure boosting means supplying full suction flow requirements of said variable delivery pump in said suction fluid conducting means to increase pressure of the suction fluid supplied from said reservoir to said pump;
  i. check valve means to connect said pressure boosting means supplying full suction flow requirements of said variable delivery pump with low pressure zone of said pump and isolate said pressure boosting means from high pressure zone of said pump;
  j. fluid distributing means responsive to pressure of the fluid delivered from said pump to said motor and operable to divert full flow of fluid flow from said motor to said reservoir and effective when said pressure increases to a given selected value;
  k. means effective when pressure of fluid flow from pump to motor drops below a given selected value to throttle fluid flow from said motor to the reservoir to regulate the speed of said motor proportionally to fluid flow delivered from said pump.

25. A fluid power transmission and control system comprising the combination of
  a. a variable delivery pump driven by a prime mover;
  b. pump control to vary pump delivery;
  c. a fluid motor connected to a load;
  d. a fluid reservoir;
  e. fluid conducting means to conduct fluid flow from the pump to the motor;
  f. fluid conducting means to conduct flow from the fluid motor to the variable delivery fluid pump and the fluid reservoir;
  g. suction fluid conducting means arranged to deliver full suction flow requirements of said variable delivery pump connecting the fluid reservoir and the pump;
  h. pressure boosting means supplying full suction flow requirements of said variable delivery pump in said suction fluid conducting means to increase pressure of suction fluid supplied from said reservoir to said pump;
  i. check valve means to connect said pressure boosting means supplying full suction flow requirements of said variable delivery pump with low pressure zone of the pump and isolate said pressure boosting means from high pressure zone of said pump;
  j. fluid distributing means responsive to pressure of fluid delivered from said pump to said motor and operable to divert full flow of fluid flow from said motor to said reservoir and effective when the pressure increases to a certain predetermined value;
  k. means effective when pressure of the fluid flow from the pump to the motor drops below a given selected value to divert fluid flow from said motor to said high pressure zone of said pump to regulate the speed of said motor proportionally to fluid flow delivered from said pump and to regenerate the energy supplied by said motor and feed it back into the prime mover.

26. A fluid power transmission and control system comprising a combination of
  a. a variable delivery pump;
  b. pump control to vary pump delivery;
  c. a fluid motor connected to a load;
  d. a fluid reservoir;
  e. fluid conducting means to conduct fluid flow from the pump to the motor;
  f. fluid conducting means to conduct flow from the fluid motor to the variable delivery fluid pump and the fluid reservoir;
  g. suction fluid conducting means to connect the fluid reservoir and the pump;
  h. pressure boosting means in said suction fluid conducting means to increase pressure of the suction fluid supplied from said reservoir to said pump;
  i. check valve means to connect said pressure boosting means with low pressure zone of the pump and isolate said pressure boosting means from the high pressure zone of said pump;
  j. fluid distributing means responsive to pressure of fluid delivered from the pump to the motor and operable to divert fluid flow from said motor to said reservoir and effective when said pressure increases to a given selected value;
  k. means effective when the fluid demand of the motor exceeds the fluid delivery of said pump to divert flow out of said motor to fluid flowing into said motor provide a free wheeling effect.

27. A fluid power transmission and control system comprising a combination of
  a. a variable delivery pump;
  b. pump control to vary pump delivery;
  c. a pump port plate having fluid conducting port means;
  d. a suction fluid pressure boosting stage supplying full suction flow requirements of said variable delivery pump in said port plate having an inlet and an outlet;
  e. check valve means between said pressure boosting stage and said fluid conducting port means to connect said pressure booster stage with said low pressure fluid conducting port means to deliver from said reservoir full suction flow requirements of said variable delivery pump and isolate said pressure booster stage from high pressure fluid conducting port means;
  f. a fluid reservoir;
  g. suction fluid conducting means connecting said reservoir to said inlet of said suction fluid pressure boosting stage, to deliver from said reservoir full suction flow requirements of said variable delivery pump;
  h. a fluid motor connected to a load;
  i. fluid conducting means to conduct fluid flow from the pump to the motor;
  j. fluid conducting means to conduct flow from the motor to the pump and the reservoir;
  k. direction control valve means responsive to pressure of the fluid delivered from the pump to the motor and operable to divert full fluid flow from said motor to said reservoir and effective when said pressure increases to a given selected value;

l. throttling means on said valve means responsive to pressure of the fluid delivered from the pump to the motor and operable to regulate the speed of said motor proportionally to fluid flow delivered from said pump when pressure of the fluid flow from the pump to the motor drops below a given selected value.

28. The combination of claim 27 including means to limit pump pressure to a predetermined maximum value by diverting fluid flow from said pump to said reservoir.

29. The combination of claim 27 including anti-cavitation check valve means effective when pressure of the fluid delivered from the pump to the motor drops below a given selected value to bypass fluid flow out of said motor to said fluid conducting means conducting fluid flow from said pump to said motor.

30. A fluid power transmission and control system comprising a combination of
a. a variable delivery pump driven by a prime mover;
b. a pump control to vary pump delivery;
c. a pump port plate having fluid conducting port means;
d. suction fluid pressure boosting stage in said port plate having an inlet and an outlet;
e. check valve means between said pressure boosting stage and said fluid conducting port means to connect said pressure boosting stage with the low pressure fluid conducting port means and isolate said pressure booster stage from the high pressure fluid conducting port means;
f. a fluid reservoir;
g. suction fluid conducting means connecting said reservoir to said inlet of said suction fluid pressure boosting stage;
h. a fluid motor connected to a load;
i. fluid conducting means to conduct fluid flow from the pump to the motor;
j. a fluid conducting means to conduct flow from the motor to the pump and the reservoir;
k. direction control valve mean responsive to pressure of the fluid delivered from the pump to the motor and operable to divert full fluid flow from said motor to said reservoir and effective when said pressure increases to a given selected value;
l. isolating means on said direction control valve responsive to pressure of the fluid delivered from the pump to the motor and operable to cut off connection between said motor and said reservoir when said pressure drops below a given selected value;
m. bypass means responsive to pressure of the fluid flowing out of the motor to connect said motor to said high pressure fluid conducting port means of said pump to regulate the speed of said motor proportionally to fluid flow delivered from said pump and to regulate the energy supplied by said motor and feed it back into the prime mover.

31. The combination of claim 30 including means to limit pump pressure to a predetermined maximum value by diverting fluid flow from said pump to reservoir.

32. The combination of claim 30 including anti-cavitation check valve means effective when the pressure of the fluid delivered from the pump to the motor drops below a given selected value to bypass fluid flow out of said motor to said fluid conducting means conducting fluid flow from said pump to said motor.

33. A fluid power transmission and control system comprising the combination of
a. a variable delivery pump;
b. pump control to vary pump delivery;
c. pump port plate having fluid conducting port means;
d. suction fluid pressure boosting stage in said port plate having an inlet and an outlet;
e. check valve means between said pressure boosting stage and said fluid conducting port means to connect said pressure booster stage with the low pressure fluid conducting port means and isolate said pressure booster stage from the high pressure fluid conducting port means;
f. a fluid reservoir;
g. suction fluid conducting means connecting said reservoir to said inlet and said suction fluid pressure boosting stage;
h. a fluid motor connected to a load;
i. fluid conducting means to conduct fluid flow from the pump to the motor;
j. a fluid conducting means to conduct flow from the motor to the pump and the reservoir;
k. direction control valve means responsive to the pressure of the fluid delivered from the pump to the motor and operable to divert full fluid flow from said motor to said reservoir and effective when said pressure increases to a given selected value;
l. cross connecting means on said direction control valve responsive to pressure of the fluid delivered from the pump to the motor and operable to cross connect the motor ports when said pressure drops a given selected value.

34. The combination of claim 33 including check valve means in said fluid conducting means between motor and reservoir to provide excess flow required at the motor inlet and to prevent cavitation.

35. A fluid power transmission and control system having a variable delivery fluid pump and a fluid motor, fluid conducting means between said variable delivery fluid pump and said fluid motor, the improvement which comprises, a fluid distributing and control system interposed between said variable delivery fluid pump and said fluid motor, said distributing and control system having motor exhaust fluid bypass means to selectively bypass full flow of motor exhaust fluid past said fluid conducting means, said exhaust fluid bypass means including motor exhaust fluid diverting means, fluid reservoir means, variable flow fluid pressure boosting means and means for phasing full suction flow requirement of said variable delivery fluid pump from said variable flow fluid pressure boosting means to said variable delivery fluid pump.

36. A fluid power transmission and control system as set forth in claim 35 wherein said fluid distributing and control system has fluid motor speed synchronizing means responsive to pressure in the fluid supplied from said variable delivery fluid pump to said fluid motor.

37. A fluid power transmission and control system as set forth in claim 35 wherein said motor exhaust fluid diverting means has means responsive to pressure in the fluid supplied from said variable delivery fluid pump to said fluid motor.

38. A fluid power transmission and control system having a variable delivery fluid pump and a fluid motor, fluid conducting means between said variable delivery fluid pump and said fluid motor, the improvement which comprises, a fluid distributing and control system interposed between said variable delivery fluid pump and said fluid motor, said distributing and control system having motor exhaust fluid bypass means to selectively bypass full flow of motor exhaust fluid past said fluid conducting means, said exhaust fluid bypass means including full flow motor exhaust fluid diverting means, fluid reservoir means, variable flow fluid pressure boosting means and means for phasing full suction flow requirement of said variable delivery fluid pump from said variable flow fluid pressure boosting means to said variable delivery fluid pump, a motor speed synchronizing means to synchronize speed of said fluid motor with the fluid flow delivered from said variable delivery fluid pump, said full flow motor exhaust fluid diverting means and said motor speed synchronizing means having means responsive to pressure in the fluid supplied from said variable delivery fluid pump to said fluid motor.

* * * * *